United States Patent [19]

Raab et al.

[11] Patent Number: 4,966,269
[45] Date of Patent: Oct. 30, 1990

[54] CLUTCH DISC HAVING A HUB DISC AND A SINTERED STEEL HUB BLANK AND A METHOD OF PRODUCING THE CLUTCH DISC

[75] Inventors: Harald Raab, Schweinfurt; Manfred Klein, Volkach; Nikolaus D. Mackert, Sennfeld; Karlheinz Hofmann, Gochsheim; Gerhard Bittenbring, Schweinfurt, all of Fed. Rep. of Germany

[73] Assignee: Fichtel & Sachs AG, Schweinfurt, Fed. Rep. of Germany

[21] Appl. No.: 357,088

[22] Filed: May 25, 1989

[30] Foreign Application Priority Data

Jun. 3, 1988 [DE] Fed. Rep. of Germany ....... 3818812

[51] Int. Cl.⁵ .............................................. F16D 13/58
[52] U.S. Cl. .................................. 192/70.16; 29/520; 192/106.2; 403/359
[58] Field of Search ............... 192/106.2, 70.16, 30 R; 403/359, 274; 29/159.3, 520; 148/400; 428/582, 583, 577

[56] References Cited

U.S. PATENT DOCUMENTS

| 1,868,764 | 7/1932 | Reed | 192/70.16 X |
| 2,564,372 | 8/1951 | Phelps et al. | 29/159.3 X |
| 4,078,445 | 3/1978 | Kiser | 74/434 X |
| 4,090,284 | 5/1978 | Kraft | 29/159.3 |
| 4,416,564 | 11/1983 | Billet et al. | 192/106.2 X |
| 4,792,030 | 12/1988 | Huber et al. | 192/106.2 |

FOREIGN PATENT DOCUMENTS

| 1112673 | 8/1961 | Fed. Rep. of Germany | 403/359 |
| 2220657 | 11/1973 | Fed. Rep. of Germany | . |
| 1264405 | 5/1969 | United Kingdom | . |
| 1407102 | 7/1973 | United Kingdom | . |
| 1541213 | 12/1974 | United Kingdom | . |
| 1438661 | 6/1976 | United Kingdom | 192/106.2 |
| 1513500 | 10/1976 | United Kingdom | . |

Primary Examiner—Rodney H. Bonck
Attorney, Agent, or Firm—Toren, McGeady & Associates

[57] ABSTRACT

The invention relates to the connection of a hub with a hub disc for a clutch disc by a plastic deformation operation of the hub, the hub is formed of heat-treatable sintered steel.

11 Claims, 4 Drawing Sheets

CLUTCH DISC HAVING A HUB DISC AND A SINTERED STEEL HUB BLANK AND A METHOD OF PRODUCING THE CLUTCH DISC

BACKGROUND OF THE INVENTION

The invention relates to a clutch disc, especially for a friction clutch in a motor vehicle. The invention further relates to a method for the production of the clutch disc and to a blank for its hub. From DE-OS 2,220, 657 a clutch disc for a motor vehicle friction clutch is known which clutch disc comprises a hub which is set non-rotatably—but axially displaceably by means of an internal toothing upon a gear shaft, and a hub disc which is firmly connected with the hub. The connection takes place through a profiling of the two parts which is made substantially play-free. An axial stop is provided for the hub disc and the axial and circumferential connection of the two parts takes place by a material deformation action on the hub in such a way that in part hub material is brought plastically into the interspaces of the profiling, with formation of a further axial stop by deformed material.

The hub of the known clutch disc had to be produced exactly by expensive chip-removing methods. Before the plastic deformation of the hub material, the toothing zones both of the hub and of the hub disc had for the one part to be produced as far as possible without play, for the other part they should also still be easy to fit.

It is the object of the present invention to be able to produce the hub hub disc component, and assemble it into a unit so that satisfactory function is guaranteed, with the minimum possible production expense.

SUMMARY OF THE INVENTION

In accordance with the invention the use of the heat-treatable sintered steel for the production of the hub makes it possible to produce the quite complicated form of the hub, practically without chip-removing machining, by sintering of a blank shaped in a mold. By manufacture of the hub as a sintered component a quality of form and surface necessary for this component is achieved in one operation. Thus a distinct simplification and cheapening of the production of such a hub are possible.

The material density of the sintered hub, at least in the deformation zone, advantageously has a minimum value of 7 g./ cm$^3$. This material density ensures that in the region of the plastic material deformation either no cracks occur or these remain below a value which influences the fatigue strength.

It is further proposed in accordance with the invention that after sintering the hub is subjected to a tempering operation—at a temperature of about 600° C. and a duration of approximately 1 hour. This heat treatment after the production procedure of the hub effects a reduction of the hardness or brittleness and renders possible a local plastic material deformation, which is durable.

According to a further feature of the invention the macrohardness has a value of 260 ... 300 HV 10 and the grain hardness a value of 380 ... 450 HV 0.2. In the region of these two hardness values an optimal deformability of the hub results in combination with a fatigue strength in accordance with the intended purpose.

The hub disc to be connected with the hub can here be formed as a simple sheet steel stamping.

According to a further feature of the invention the profiling is part of an external toothing of the hub, where a reduced external diameter of the teeth of the external toothing is provided in the region of the seating of the hub disc and the step formed by the diameter differences serves as axial stop of the hub disc during the deformation operation. In this simple manner the external toothing of the hub, which is necessary in any case, can serve at the same time as fixing for the hub disc, and due to the diameter difference a satisfactory axial abutment is formed during the deformation operation and also during subsequent operation.

The hub comprises, axially adjoining the external toothing with reduced external diameter, a cylindrical zone which is made smaller in diameter than the root circle diameter of the toothing. This diameter serves for the guidance of the plunger which executes the deformation operation.

The step formed by the reduced diameter and the cylindrical zone is made conical—with a recess of channel shape —this cone widening away from the hub disc. Due to this formation the radially outer region of the toothing with the reduced external diameter is deformed by the plunger in the direction towards the inserted hub disc in such a way that for the one part the recess of channel shape extends, after deformation, substantially parallel to the radial plane and for the other part swaged material fills out the slight radial gap, still present before assembly, between hub disc and hub and at the same time produces an axial excess which additionally axially fixes the hub disc.

The various features of novelty which characterize the invention are pointed out with particularity in the claims annexed to, and forming a part of, this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will next be explained in greater detail by reference t example of embodiment. Individually.

DESCRIPTION OF PREFERRED EMBODIMENTS

Figure 1:
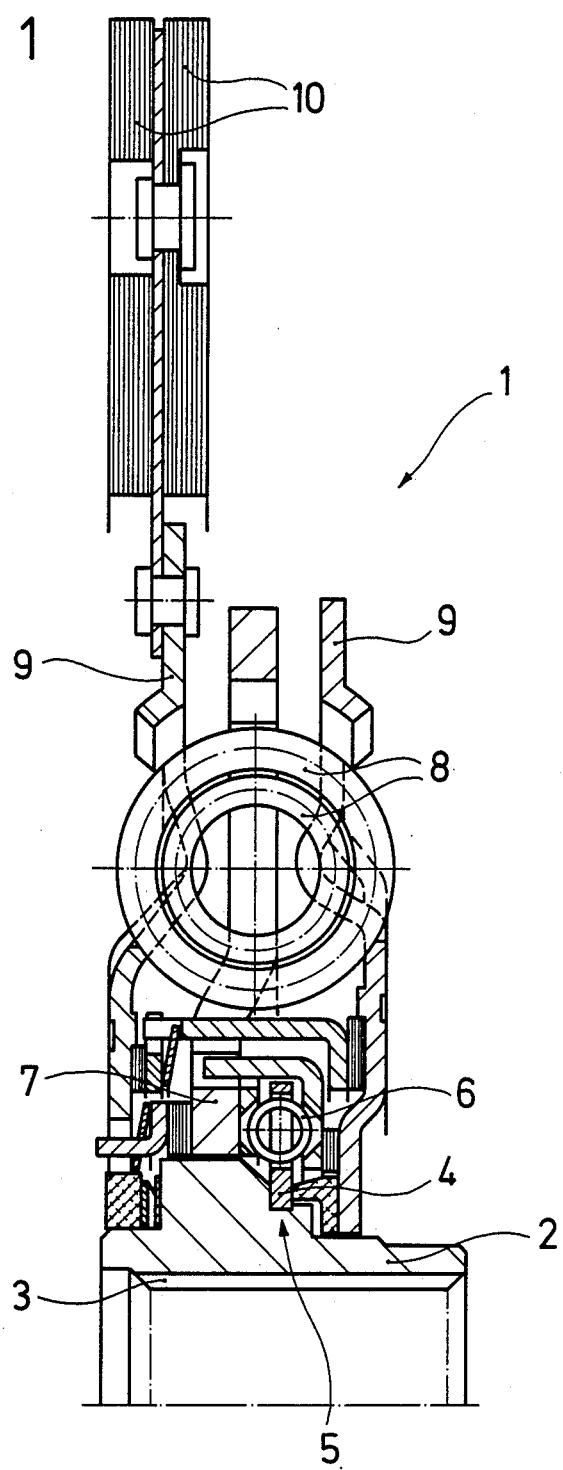
FIG. 1 shows the upper half of a longitudinal section through a clutch disc with torsional vibration damper.

FIG. 1 shows the general installation situation. A clutch disc 1 of conventional construction type comprises a hub 2 which can be set non-rotatably—but axially displaceably—by means of an internal toothing 3 upon a gear shaft (not shown). The hub 2 comprises a profiling 5 which carries a hub disc 7 with play in the circumferential direction, the hub disc 7 comprising windows for the reception of helical springs 8. Beside the hub disc 7 cover plates 9 are arranged which likewise comprise windows for the helical springs 8. One of these cover plates 9 is provided with radially outwardly extending friction linings 10. The helical springs 8 form the torsion spring system for the under-load range. For the idling range smaller helical springs 6, arranged in corresponding windows of a hub disc 4, are provided radially within the circle of the arrangement of the helical springs 8. This hub disc 4 is set upon a part of the profiling 5 and connected with the material of the hub 2 by a plastic swaging operation.

Details of the formation and connection appear from FIGS. 2 to 5.

Figure 2:
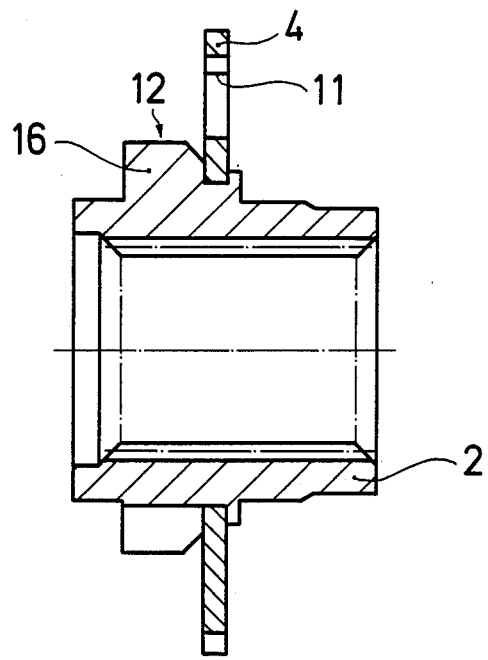
FIGS. 2 and 3 show a section and elevation of a hub with hub disc in enlarged representation.
Figure 3:
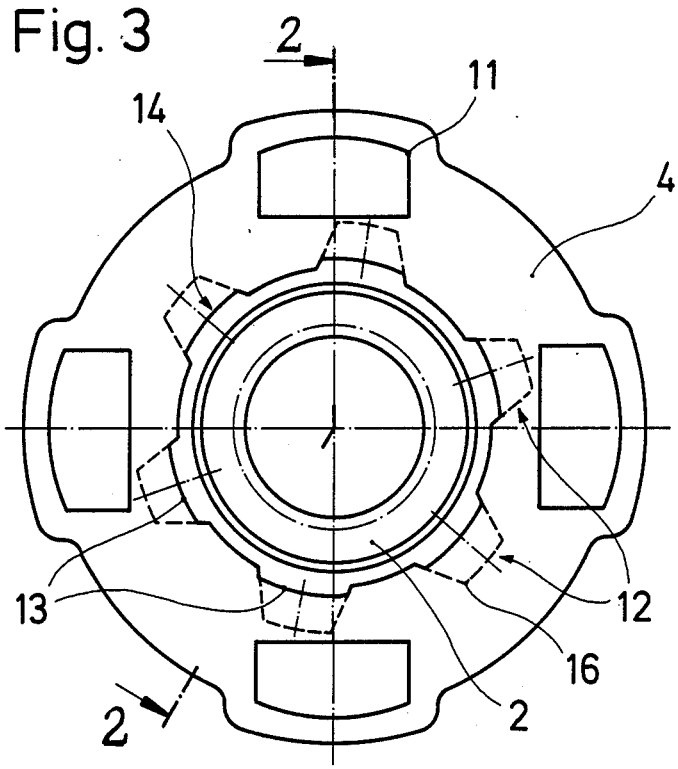

FIG. 2 shows a section 2—2 through the elevation according to FIG. 3 of the hub 2 with hub disc 4 in enlarged representation. The hub 2 consists of a heat-treatable sintered steel with a density of at least 7 g./cm$^3$, in the region of the deformation and is heat-treated after the sintering production action as hub blank at a temperature of 600° C. and with a duration of about 1 hour, in order that it may be connected with the hub disc 4 by a plastic swaging operation. The hub here has a macrohardness of about 260 . . . 300 HV 10 and a grain hardness of 380 . . . 450 HV 0.2. (Vickers hardness according to German Standard DIN 50133). The hub 2 is already provided as a blank with teeth 16 of an external toothing 12, the external diameter of which is reduced at 14. According to this reduced external diameter 14, the hub disc 4 has an internal toothing 13 which can be set substantially without play on the remaining toothing of the hub. The hub disc 4 further comprises windows 11 for the reception of torsion springs It is made as a simple sheet metal stamping.

Figure 4:
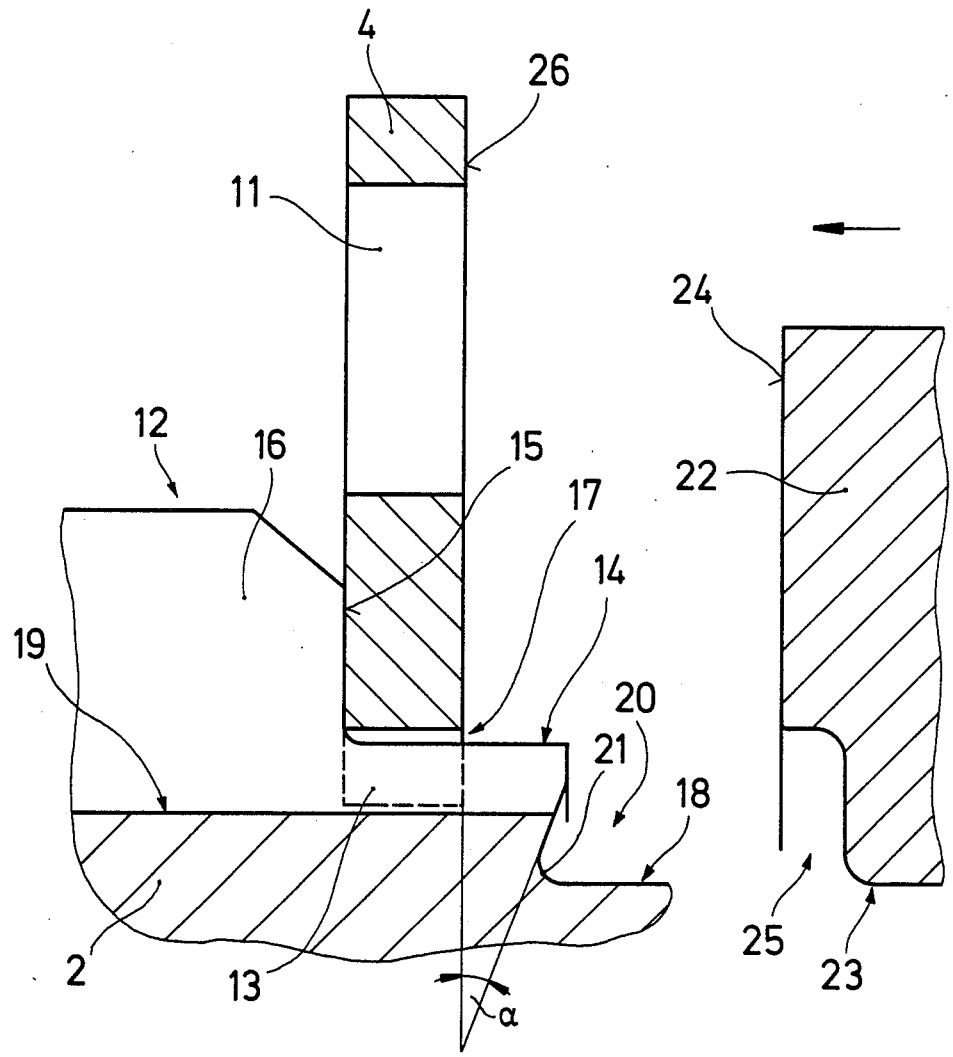
FIGS. 4 and 5 show greatly enlarged partial pieces of the hub with hub disc before and after the deformation operation.
Figure 5:
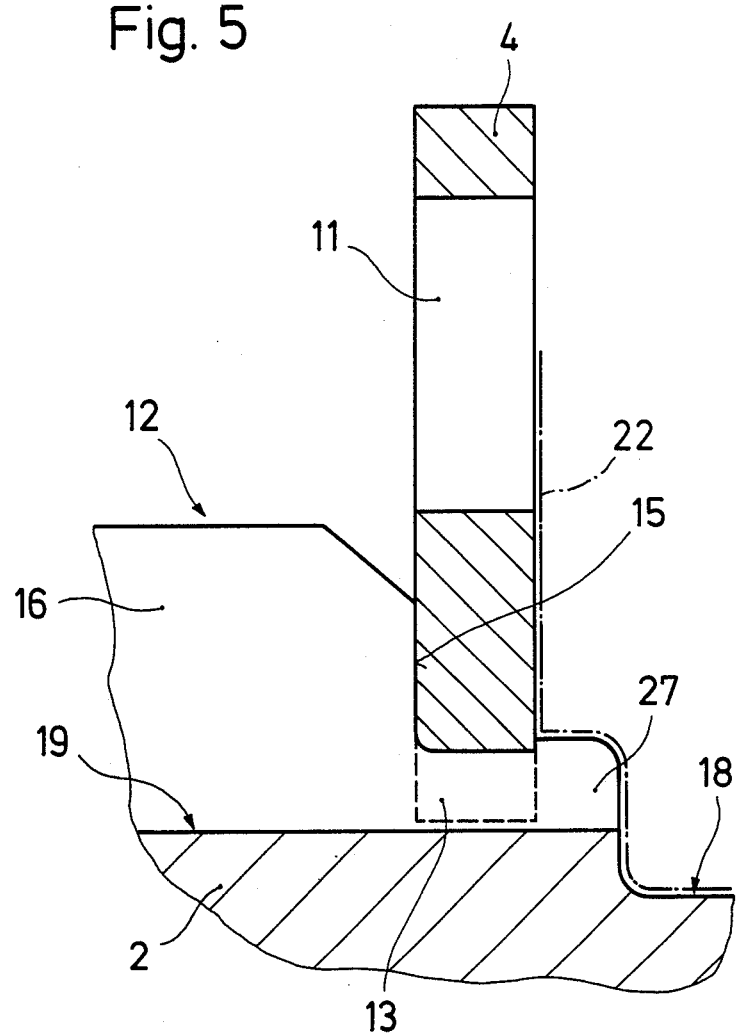

The assembly situation appears especially from FIG. 4, which shows a section of the hub 2 and the hub disc 4 in greatly enlarged representation Furthermore the plunger 22 necessary for swaging is reproduced. The hub 2. with its external toothing 12, of which a part of one tooth 16 is visible, is provided at the one end with a reduced external diameter 14. In this region the tips of the teeth 16 are greatly reduced. This difference of diameter results in an axial stop 15 for the hub disc 4, the latter comprising on its internal diameter a corresponding internal toothing 13, adapted to the reduced external diameter 14. The hub disc 4 is here set substantially without play upon the toothing with the reduced external diameter 14, whereby admittedly there is still a slight gap 17 between reduced external diameter 14 and internal toothing 13. The reduced external diameter 14 of the toothing 12 is made longer in the axial direction than the material thickness of the hub disc 4. In this region the hub 2 is provided with a cylindrical zone 18 which has a smaller diameter than the root circle 19 of the toothing 12. Moreover a recess 21 of channel type forming a cone opening away from the hub disc 4 is provided between this cylindrical zone 18 and the end of the toothing. Here an angle α of about 15 . . . 30° is generated in relation to a radial plane. In the region of this step 20 thus formed a plastic material deformation is effected by the plunger 22, in order to bring about a firm connection between hub 2 and hub disc 4. The plunger 22 has a bore 23 which can be set upon the cylindrical zone 18 of the hub 2. Furthermore the plunger 22 has an end face 24 which extends parallel to the radial plane and stands parallel opposite to the face 26 of the hub disc 4. The plunger 22 comprises a recess 25 which corresponds both in the axial and in the radial direction to the desired material form after the plastic deformation. The plunger 22 is now moved in the direction towards the hub disc 4, whereby the toothing 12 is plastically deformed in the region of the reduced external diameter 14, namely in such a way that for the one part the gap 17 is closed by the inflow of hub material and for the other part the swaged material is thrown up according to FIG. 5 in the region 27 in front of the toothing, so that an axial step is produced 10 which additionally holds the hub disc 4 in the axial direction in shape-engaging manner. As represented in FIG. 5, the recess 21 of channel shape according to FIG. 4 has disappeared, since a front face extending parallel to the radial plane has occurred by the plastic deformation operation and according to the form of the recess 25 of the plunger 22. Due to this deformation action all the teeth 16 are plastically deformed in the region of the reduced external diameter from the side of the recess 21 of channel form or shape and thus a non-rotatable and axially fast connection is produced between hub disc 4 and hub 2.

While specific embodiments of the invention have been shown and described in detail to illustrate the application of the inventive principles, it will be understood that the invention may be embodied otherwise without departing from such principles.

What we claim is:

1. A clutch disc for a friction clutch, comprising an axially extending internally toothed hub (2) having an external axially and circumferentially extending surface and comprising at least in part a thermally treated sintered steel and having said external surface having an axially and circumferentially extending section with a profile (12) differing from a cylindrical form and said section having a radially extending face (154) forming a stop surface facing in the axial direction, and a hub disc (4) of annular disc form with an axially and circumferentially extending internal profile (13) complementary to the profile (12 of the section of said hub (12) and set non-rotatable upon the profile (12), said hub disc being axially fixed on said hub between said radially extending face and material deformation zones (27) formed on the hub (2) by material deformation of the hub, the hub (2) comprises at least in the region of the material deformation zones (27), said sintered steel with a material density of at least 7 g./cm$^3$.

2. A clutch disc according to claim 1, wherein the hub (2) consists of sintered steel with a macrohardness of 250 to 300 HV 10 and a grain hardness of 380 to 450 HV 0.2.

3. A clutch disc according to claim 1, wherein the section of said hub (2) has a toothed said profile (12) and the external diameter thereof is reduced in an axially extending limited region (14) for the formation of the radially extending face (15) and a seat for the hub disc (4), said toothed profile has a root circle diameter (19), the hub (2) comprises, axially adjoining the region (14) of reduced diameter of said toothed profile (12), an axially extending cylindrical zone (18) having a diameter smaller than the root circle diameter (19) of the external toothing (12), a radially extending stop face on said hub, said toothed profile on said hub and said stop face are formed in the sintering operation on said hub.

4. A method of producing a clutch disc for a friction clutch, comprising a hub (2) provided with an axially and circumferentially extending external profile (12) differing from a circular form and a hub disc (4) of annular disc form laterally enclosing the hub (2), and having an internal profile (13) complementary to the external profile (12) of the hub (2) for connecting the hub disc (4) rottatably with the hub (2), and fixing said hub disc to said hub by deformation of the material of the hub (2), comprising the steps of shaping the hub (2) at least in a region to be deformed from steel material to be sintered, sintering the steel material of the hub (2) to a material density of 7 g/cm$^3$ and, after sintering the hub (2), heat treating the hub (2) and then uniting the hub (2) with the hub disc (4) and connecting the hub disc (4) be deforming a portion of the external profile of the hub (2) into engagement with the internal profile of said hub disc.

5. A method according to claim 4, further comprising the step of subjecting the hub (2), after the sintering and before the deforming step, to a heat-treatment at a temperature of approximately 600° for approximately one hour.

6. A method according to claim 4, further comprising the steps of providing the hub (2) in the course of the sintering, with an axially and circumferentially extending external toothing (12) in a zone for receiving the hub disc (4) and, axially adjoining the external profile, forming a cylindrical zone (18) having an external diameter smaller than a root circle diameter (19) of the external toothing (12) and deforming the external toothing (12) adjoining the cylindrical zone (20) towards the hub disc (4) by means of a plunger (2) and guiding the plunger on the cylindrical zone (18) of the hub (2).

7. A method according to claim 6, further comprising the steps of, during the sintering step, shaping a recess (21) of axially and circumferentially extending channel shape at a transition from the external toothing (12) to the cylindrical zone 918), and forming a substantially conical end face in said recess adjacent the external toothing inclined by about 15° to 30° in relation to the radial direction.

8. A method according to claim 7, wherein the plunger (22) has in the region of the external toothing (12) an end face (24) parallel to the radial direction and using the end face for deforming the conical end face so that it extends approximately parallel to the radial direction, providing the end face for deforming the conical end face with a central recess (25) in the radially extending end face (24) of the plunger (22), with the plunger (22) resting on the hub disc(4) after the deforming step.

9. A blank for a hub of a clutch disc for a motor vehicle friction clutch, comprising a hub body (2) of a permanently deformable steel material, comprising an axially and circumferentially extending internal toothing and an axially and circumferentially extending external toothing (12), and the hub body (2) comprises at least in part thermally treated sintered steel having a material density of at least $7g/cm^3$.

10. A blank according to claim 9, wherein the external toothing (12) extends axially at least between a radially protruding stop face (15) and a cylindrical zone (18) having an external diameter smaller than a root circle diameter (19) of the external toothing (12) and said cylindrical zone merges with said external toothing in a conical surface which together with the cylindrical zone (18) forms a recess (21) of channel shape radially inwardly of the external toothing (12).

11. A blank according to claim 10, wherein the conical surface is inclined by about 15° to 30° to the radial direction.

* * * * *